(12) United States Patent
Yang et al.

(10) Patent No.: US 7,264,898 B2
(45) Date of Patent: Sep. 4, 2007

(54) PRIMARY ZINC-AIR BATTERY

(76) Inventors: De-Qian Yang, 17800 Castleton St., Suite 435, City of Industry, CA (US) 91748; Yu-Qiang Yang, 17800 Castleton St., Suite 435, City of Industry, CA (US) 91748

( * ) Notice: Subject to any disclaimer, the term of this patent is extended or adjusted under 35 U.S.C. 154(b) by 420 days.

(21) Appl. No.: 11/041,693

(22) Filed: Jan. 24, 2005

(65) Prior Publication Data
US 2006/0166062 A1 Jul. 27, 2006

(51) Int. Cl.
H01M 4/00 (2006.01)
H01M 2/18 (2006.01)
H01M 4/42 (2006.01)
H01M 2/16 (2006.01)

(52) U.S. Cl. .................. 429/27; 429/130; 429/229; 429/246

(58) Field of Classification Search .................. 429/27, 429/229, 245, 246, 130, 29
See application file for complete search history.

(56) References Cited

U.S. PATENT DOCUMENTS

| 4,152,489 A * | 5/1979 | Chottiner ..................... 429/27 |
| 5,458,988 A * | 10/1995 | Putt ............................. 429/27 |
| 6,242,121 B1 * | 6/2001 | Pedicini et al. ............... 429/27 |

* cited by examiner

*Primary Examiner*—Patrick Joseph Ryan
*Assistant Examiner*—Thomas H. Parsons
(74) *Attorney, Agent, or Firm*—Thomas, Kayden, Horstemeyer & Risley

(57) ABSTRACT

A rectangular-shaped primary zinc-air battery is provided. Hence, many components of the primary zinc-air battery can be designed in shapes of sheets for easy production. In addition, the primary zinc-air battery comprises two sheets of air cathodes on opposite sides of the zinc-air battery to double the power output.

15 Claims, 6 Drawing Sheets

PRIMARY ZINC-AIR BATTERY

BACKGROUND OF THE INVENTION

1. Field of Invention

The present invention generally relates to a metal-gas cell battery. More particularly, the present invention relates to a primary zinc-air battery.

2. Description of Related Art

The growth in use of portable electronic devices has increased the demand for primary power sources. The alkaline Zn—Mn battery is the most popularly used primary battery at present. Nevertheless, due to its low specific energy, it is not suitable to be used as the power source of the most portable electronic equipment, such as military communication devices. Therefore, $LiSO_2$ and $LiMnO_2$ primary batteries are used instead, but these batteries are very expensive. As electronic equipment becomes more and more ubiquitous, the demand for environmental friendly primary batteries with both high specific energy and high specific power is more and more pressing.

Among all of the battery technologies, metal-air batteries are the most attractive technology because of their high specific energy. Metal-air batteries deliver the high specific energy due to the use of atmospheric oxygen as their cathode reactant. Compared to other batteries of similar size, the use of atmospheric oxygen allows the metal-air cell to contain more anode material to provide a larger energy capacity. Therefore, a longer lifetime is obtained.

Among the metal-air batteries, the zinc-air battery technology is the only commercialized technology. Since the last century, the zinc-air button battery has been extensively used for entertainment electronics, pocket calculators and especially hearing aids. However, it can't be extensively used in other high-drain electronic devices due to its relatively low specific power.

Many companies and institutions wish to develop a primary zinc-air battery of AA or AAA size, which have both high specific energy and high specific power. This battery would have nearly three times the energy of an ordinary alkaline Zn—Mn battery. Many prototypes have been made successfully, but no company has yet succeeded in commercialization. The obstacle is the complicated manufacturing process of the cylindrical-shaped air cathode.

Two methods have been used to fabricate the cylindrical-shaped air cathode. The first method is to prepare the air cathode as a flat sheet and then roll it into a cylinder, as shown in U.S. Pat. No. 6,461,761. However, the rolling process may crack the air cathode, resulting in the leakage of electrolyte and failure of the cell. The second method is to fabricate the cylindrical-shaped air cathode by putting the necessary materials onto a cylindrical-shaped electrically conductive mesh. However, this is a very difficult and slow process, and the high manufacturing cost incurred leads to failure in competing with ordinary alkaline Zn—Mn battery.

SUMMARY OF THE INVENTION

In one aspect, the present invention provides an improved structure for primary zinc-air batteries. The improved structure is featured in its unique rectangular shape instead of the traditional cylindrical shape.

In another aspect, the present invention provides a primary zinc-air battery, which is suitable for mass production with little labor cost to compete with the ordinary Zn—Mn battery on the market.

In yet another aspect, the present invention provides a primary zinc-air battery, which has two sheets of air cathodes to output both high energy density and high power density.

In accordance with the foregoing and other aspects of the present invention, a primary zinc-air battery is provided here and the components of the primary zinc-air battery are described below. A plastic holder of a rectangular shape is provided, which has a vertical wall for defining two opposite openings. Two sheets of separators respectively cover the two openings, and two first sealing elements are used to respectively seal edges of the two openings and the two separators for forming a cavity. An anode material, an electrolyte solution and an anode conductor are placed in the cavity. Two sheets of air cathodes laminate over outer surfaces of the two separators. Two second sealing elements are located on edges of the two air cathodes, respectively. Each of two conductive half-housings has a vertical wall and a cathode opening, and the two conductive half-housings connect to the two air cathodes and encase over the two air cathodes to expose the two air cathodes from the cathode openings, respectively.

According to a preferred embodiment, there are further spacer rings bracketing over the two half-housings for providing air passages. The anode conductor is preferably pin-shaped and fixed in an anode opening, opposite to the cathode conductor and formed on the vertical wall of the plastic holder.

In accordance with the foregoing and other aspects of the present invention, another primary zinc-air battery is provided. All components are similar to those of the primary zinc-air battery described above except the anode conductor. The anode conductor is preferably sinusoidal-shaped. Two ends of the anode conductor are fixed tightly in two holes on the vertical wall of the plastic holder and jut out from the two holes and bend on one of the cathode openings. Furthermore, two shims cover the two exposed ends of the anode connector for insulating the two ends of the anode from one of the conductive half-housings.

In light of the foregoing, plural zinc-air batteries can be electrically connected and put in a case to form a battery pack for providing various voltages. Air can be supplied by a fan installed on the case and exhaust from plural outlets on the case.

As embodied and broadly described herein, the invention provides an improved structure of a primary zinc-air battery, which is in rectangular shape. Therefore, the primary zinc-air battery is suitable for mass production with little labor cost. Moreover, the primary zinc-air battery comprises two air cathodes to double the output power. Hence, the primary zinc-air battery can compete with standard-sized batteries in the market.

It is to be understood that both the foregoing general description and the following detailed description are made by use of examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Embodiment 1

In this invention, a zinc-air battery with rectangular cross section is developed instead of an ordinary AA-size alkaline Zn—Mn battery with round cross section. According to a preferred embodiment of this invention, a biscuit type of zinc-air battery is developed to deliver higher power. All the current biscuit type and button type zinc-air batteries have only one sheet of air cathode installed on one major surface of the zinc-air battery. According to a preferred embodiment of this invention, there are two sheets of air cathode installed on two opposite major surfaces of the zinc-air battery. Therefore, the power can be doubled and may deliver nearly three times the energy of the AA-size alkaline Zn—Mn battery.

Figure 1:
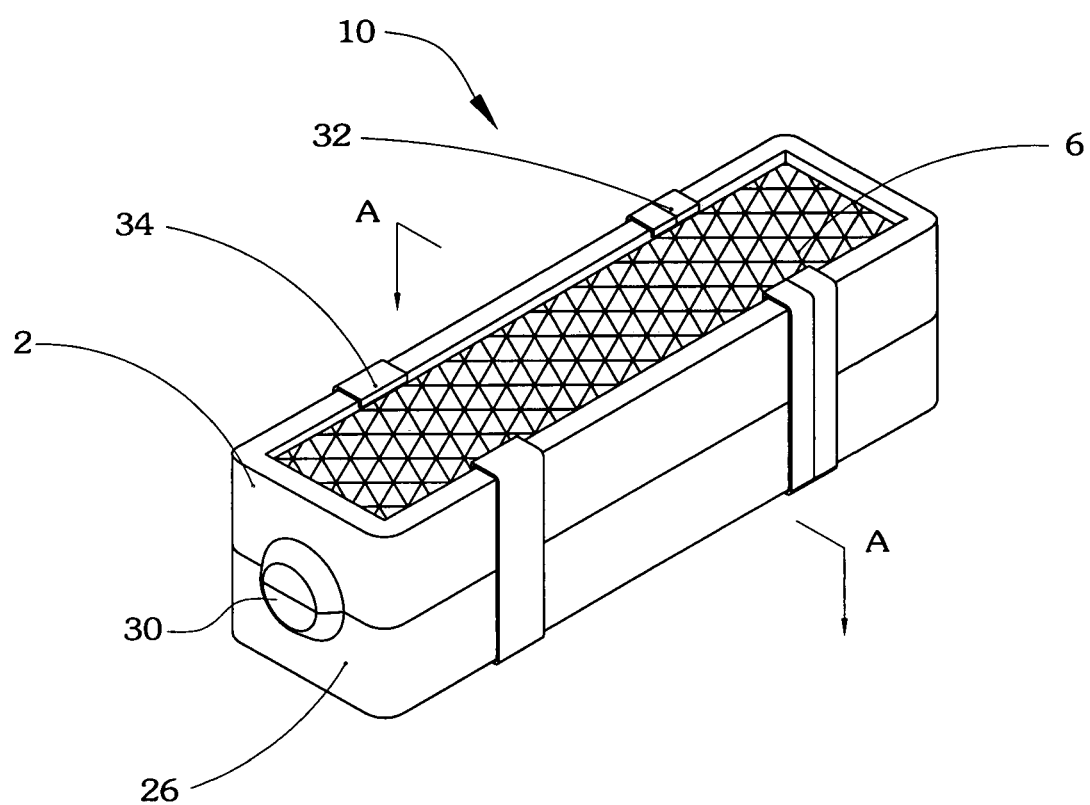
FIG. 1 is a perspective view of a zinc-air battery according to a preferred embodiment of this invention.

FIG. 1 is a perspective view of a zinc-air battery according to a preferred embodiment of this invention. In FIG. 1, the zinc-air battery 10 with rectangular cross section has two half-housings 2 and 26, which are made by a conductive material, such as metal, and laser-beam welded to form the housing of the zinc-air battery 10. Four spacer rings 32 and 34 bracket the zinc-air battery 10, and an air cathode 6 is located on the upper surface of the zinc-air battery 10.

Figure 2:
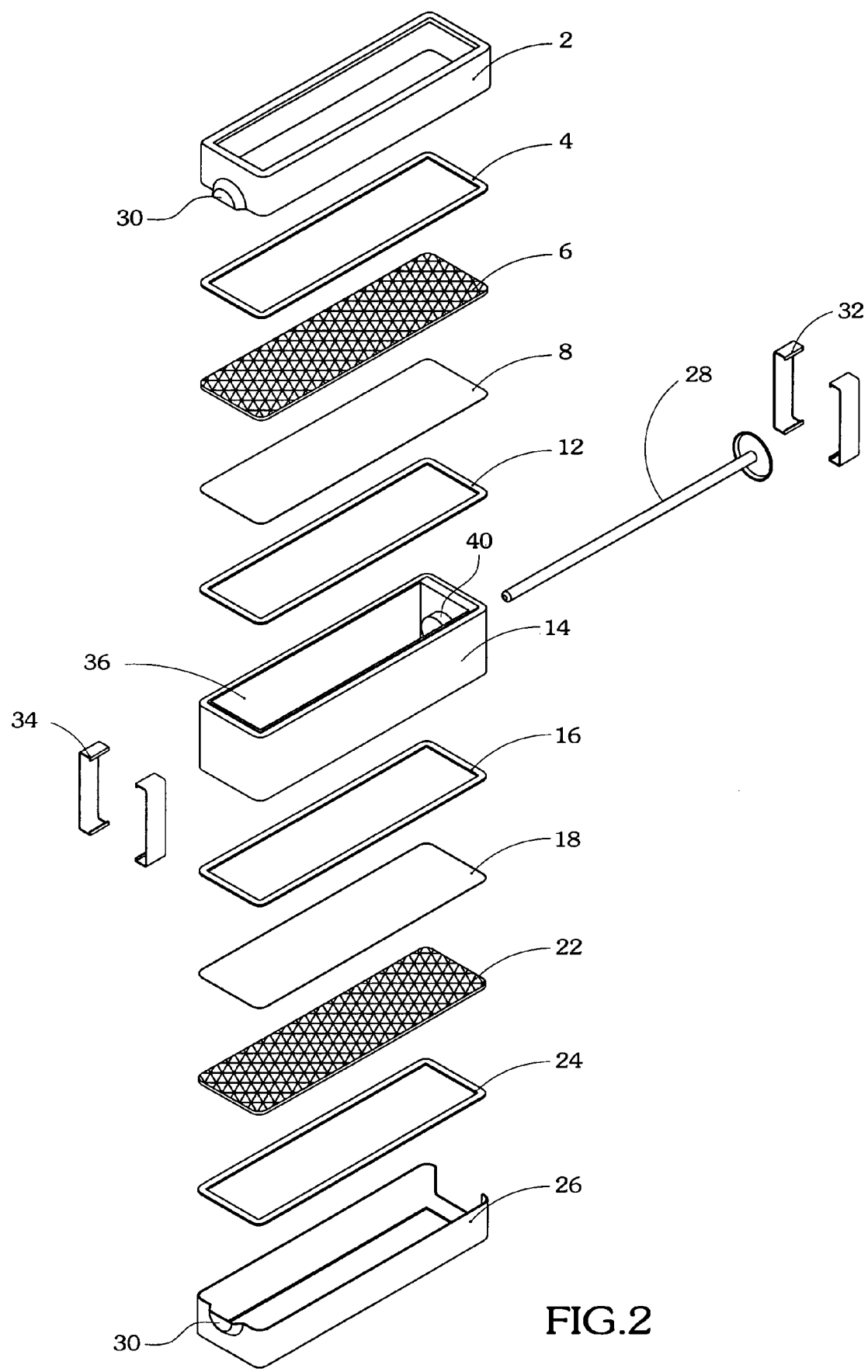
FIG. 2 is an exploded view of the zinc-air battery shown in FIG. 1.

FIG. 2 is an exploded view of the zinc-air battery shown in FIG. 1. From top to bottom of the FIG. 2, there are a half-housing 2, a sealing element 4, an air cathode 6, a separator 8, a sealing element 12, a plastic holder 14, a sealing element 16, a separator 18, an air cathode 22, a sealing element 24, and a half-housing 26 to form the main body of the zinc-air battery 10.

Among the components described above, the separators 8 and 18 cover the opposite openings of the plastic holder 14. The sealing elements 12 and 16 seal the edges of the plastic holder 14 and the separators 8 and 18 to form a leak-proof space for accommodating an anode material, i.e. zinc powder, an anode conductor and an electrolyte solution. Therefore, a suitable amount of zinc powder, CMC (carboxyl methyl cellulose), KOH solution and other necessary additives can be filled in the cavity 36 of the plastic holder 14.

A pin-shaped anode conductor 28 is placed in the cavity 36 of the plastic holder 14 by inserting through an anode opening 40 on a rear wall of the plastic holder 14. The material of the anode conductor 28 is preferably Cu or any other suitable conductive materials. To avoid self-discharge, the copper anode conductor 28 should be coated with a thin layer of hydrogen evolution inhibitor, such as indium or tin, where the thickness of the indium layer is preferably about 0.003~0.004 mm.

Two air cathodes 6 and 22 are respectively laminated over the outer surfaces of the separators 8 and 18, and two sealing elements 4 and 24 are respectively placed on the edges of the two air cathodes 6 and 22. After tightly pressing the two half-housings 2 and 26, the two half-housings 2 and 26 are welded together by a laser-beam welder. Then, the four spacer rings 32 and 34 are bracketed over the two half-housings 2 and 26. Furthermore, two cathode conductors 30 are respectively located on the front walls of the two half-housings 2 and 26, which respectively electrically connect to the two air cathodes 6 and 22.

In light of the foregoing, the separators 8 and 18 are used to mechanically separate the zinc anode, which is located in the cavity 36 of the plastic holder 14, from the air cathodes 6 and 22. The four spacer rings 32 and 34 are used to create air passages surrounding the zinc-air battery 10 such that sufficient air can be provided to the zinc-air battery 10. Moreover, the spacer rings 32 and 34 can prevent short circuits between two neighboring zinc-air batteries 10, which are set side by side. The spacer rings 32 and 34 are preferable made of rubber, polyvinyl chloride (PVC), thermoplastic rubber (TPR), or other suitable insulator material.

Figure 3:
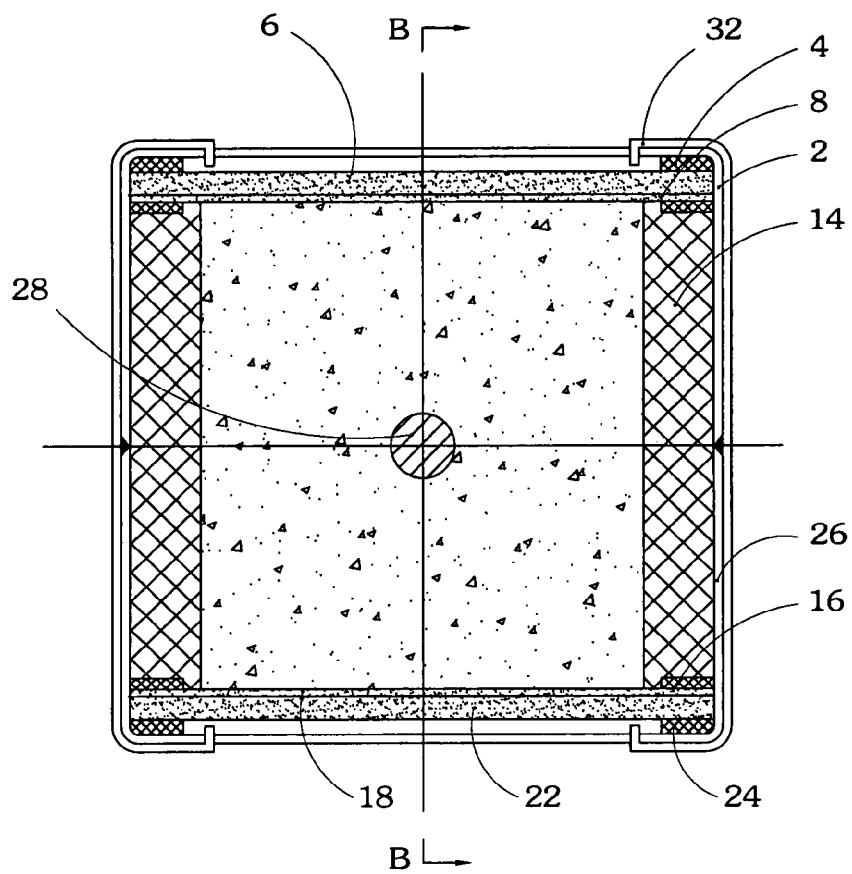
FIG. 3 is a cross-sectional view taken along the A-A line of the zinc-air battery of FIG. 1.

FIG. 3 is a cross-sectional view taken along the A-A line of the zinc-air battery of FIG. 1. FIG. 3 shows relative positions of all components assembled. The spacer rings 32 are the same as the spacer rings 34. The, upper half-housing 2 is the same as the lower half-housing 26. The two separators 8 and 18 are the same size. The two sheets of air cathodes 6 and 22 are the same size. All four sealing elements 4, 12, 16 and 24 are the same size, too.

Figure 4:
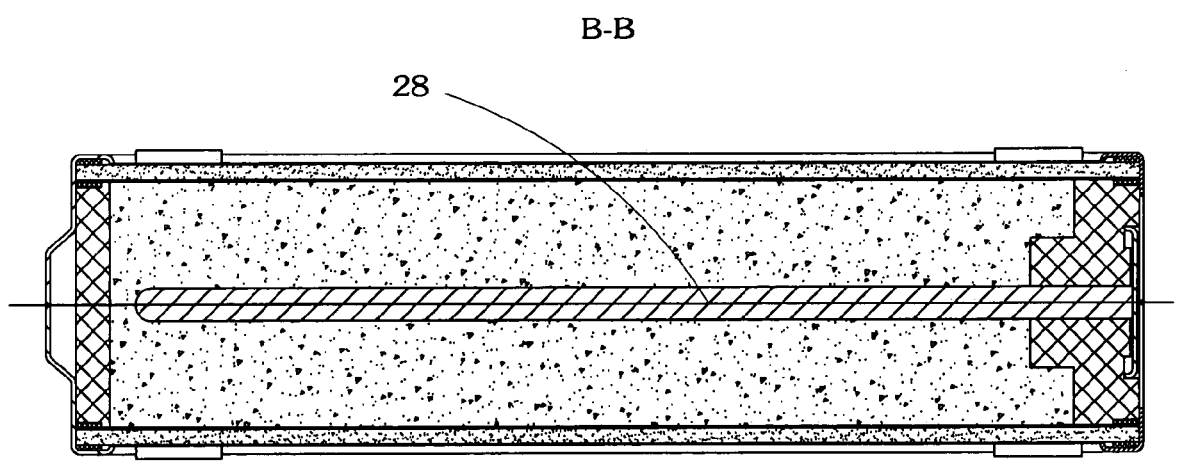
FIG. 4 is a cross-sectional view taken along the B-B line of the zinc-air battery of FIG. 3.

FIG. 4 is a cross-sectional view taken along the B-B line of the zinc-air battery of FIG. 3. FIG. 4 clearly shows the location of the anode conductor 28. The anode conductor 28 is tightly fitted to the hole located at the rear end of the plastic holder 14. Hence, no electrolyte could leak between the anode conductor 28 and the wall of the hole of the plastic holder 14 without using any glue.

In light of the foregoing, the zinc-air battery 10 is designed to replace the ordinary AA-size Zn—Mn primary battery. Hence, the overall length of the zinc-air battery 10 is preferably the same as the ordinary AA-size Zn—Mn battery; and the width and height of its rectangular cross section is preferably 14.5 mm, i.e. the same diameter as that of the ordinary AA-size Zn—Mn battery. Therefore, the zinc-air battery 10 can occupy the same space in any appliance using AA-size Zn—Mn batteries.

Please note that there are two air cathodes 6 and 22 installed on two opposite sides of the zinc-air battery 10. Powerzinc's air cathodes can deliver more than 50 mA/cm$^2$ without an air fan. The total area of the two air cathodes 6 and 22 is about 9 mm$^2$; hence the zinc-air battery can deliver a current up to about 450 mA. Moreover, the zinc-air battery 10 is capable of delivering at least about 5 Ah of energy capacity, and its working voltage is about 0.9~1.25 V.

Embodiment 2

Figure 5:
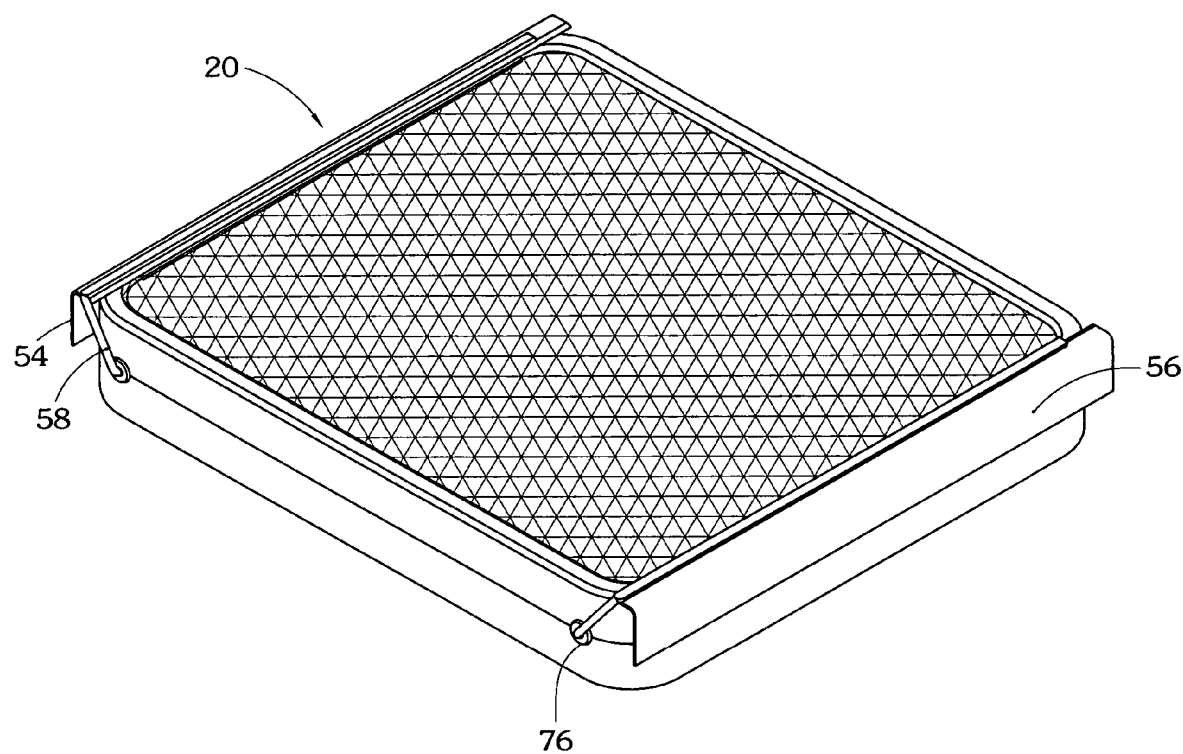
FIG. 5 is a perspective view of a zinc-air battery according to another preferred embodiment of this invention.

FIG. 5 shows a perspective view of a zinc-air battery according to another embodiment of the present invention. The principle of constructing the zinc-air battery 20 shown in FIG. 5 is the same as that for the zinc-air battery 10 in FIG. 1, but the size of the zinc-air battery 20 is shorter and wider. The zinc-air battery 20 having the dimensions of 58.4 mm×50.4 mm×8.7 mm (L×W×H) is capable of delivering an energy larger than 15 Ah.

In FIG. 5, two ends of an anode conductor 58 are respectively pulled out through two tight holes 76. To avoid possible leakage of the electrolyte solution, suitable sealing glue is glued on the adjacent surfaces.

Figure 6:
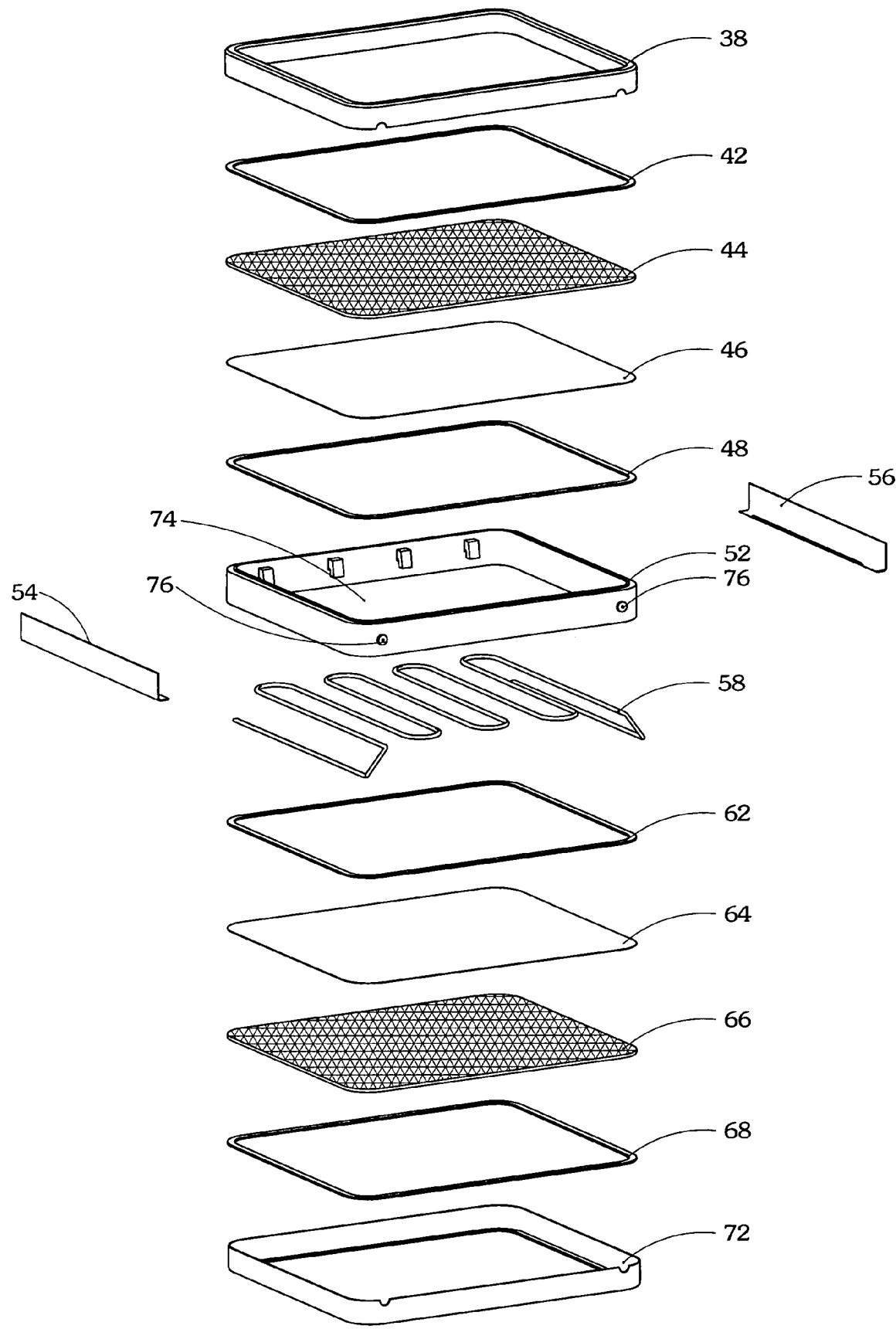
FIG. 6 is an exploded view of the zinc-air battery shown in FIG. 5.

FIG. 6 is an exploded view of the zinc-air battery 20 shown in FIG. 5. From top to bottom, there are a half-housing 38, a sealing element 42, an air cathode 44, a separator 46, a sealing element 48, a plastic holder 52, an anode conductor 58, a sealing element 62, a separator 64, an air cathode 66, a sealing element 68 and a half-housing 72. Two shims 54 and 56 are used to insulate the anode conductor 58 and the half-housing 38.

Similarly, the separator 46, the sealing element 48, the plastic holder 52, the sealing element 62, and the separator 64 cooperate to form a leak-proof space to accommodate an anode material, i.e. zinc powder, an anode conductor and an electrolyte solution. Therefore, a suitable amount of zinc powder, CMC (carboxyl methyl cellulose), KOH solution and other necessary additives are filled in the cavity 74 of the plastic holder 52.

The two ends of the anode conductor 58 are turned over onto an outer surface of the zinc-air battery 20 and respectively insulated with shims 54 and 56. These two ends of the anode conductor 58 can contact an outer surface of another neighboring zinc-air battery (not shown) next to the zinc-air battery 20. Therefore, any number of zinc-air batteries 20 can be connected in series to have a desired voltage.

Since the other components of the zinc-air battery 20 are similar to the corresponding components of the zinc-air battery 10, other illustrations are omitted here.

Figure 7:
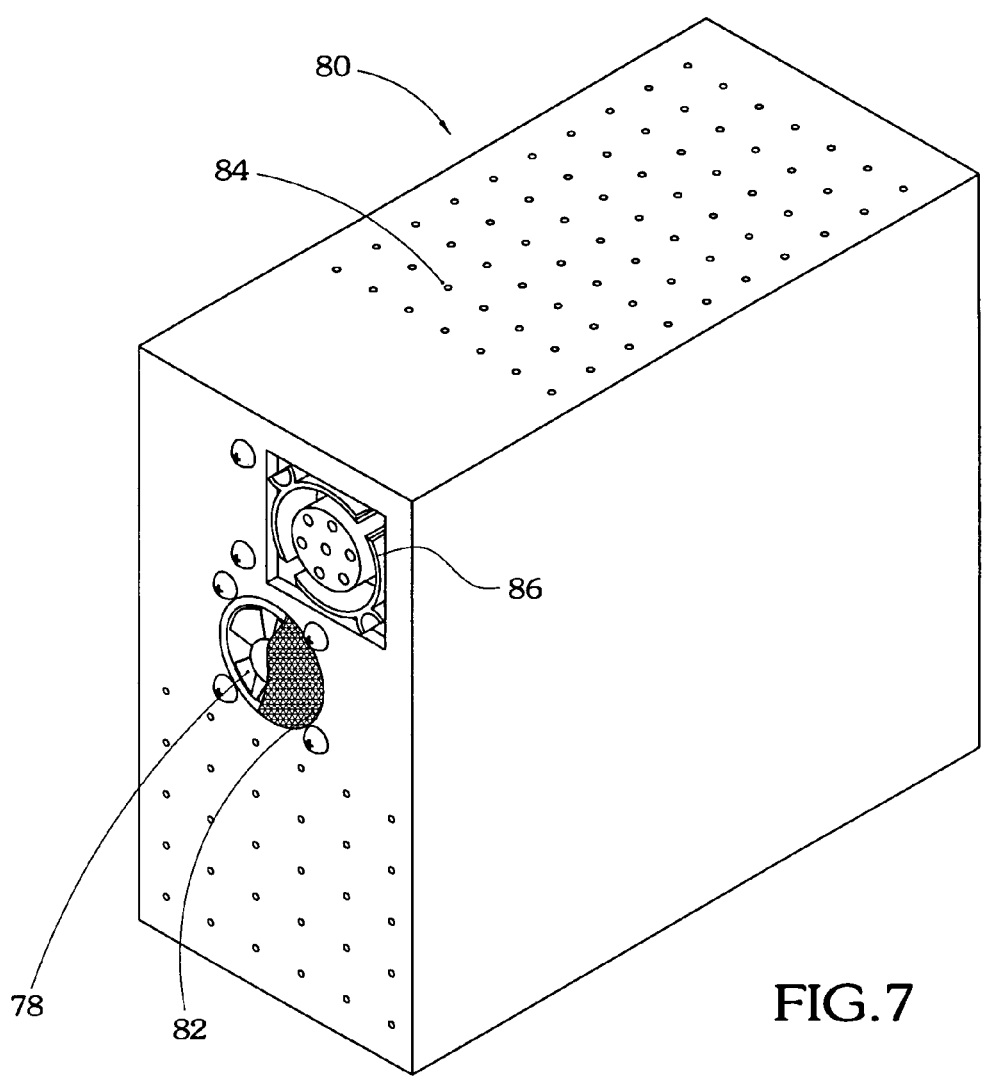
FIG. 7 is a battery pack constructed with pieces of the zinc-air battery shown in FIG. 5.

FIG. 7 is a battery pack 80 constructed with pieces of the zinc-air batteries 20 shown in FIG. 5. The battery pack 80 can have the same size as a lithium ion battery 5590 with dimensions of 112 mm×63 mm×127 mm (L×W×H). Only a few differences exist between the zinc-air battery pack 80 and lithium ion battery 5590. First, a fan 78 needs to be installed on an outer surface of the casing of the battery pack 80 to supply air to the zinc-air batteries 20 inside the battery pack 80. The diameter of the fan 78 is preferably 20~30 mm. Second, a metal mesh 82 is installed in front of the fan 78 to protect the fan 78 from damage. Last, there are many air outlets 84 on the casing of the battery pack 80.

Figure 8:
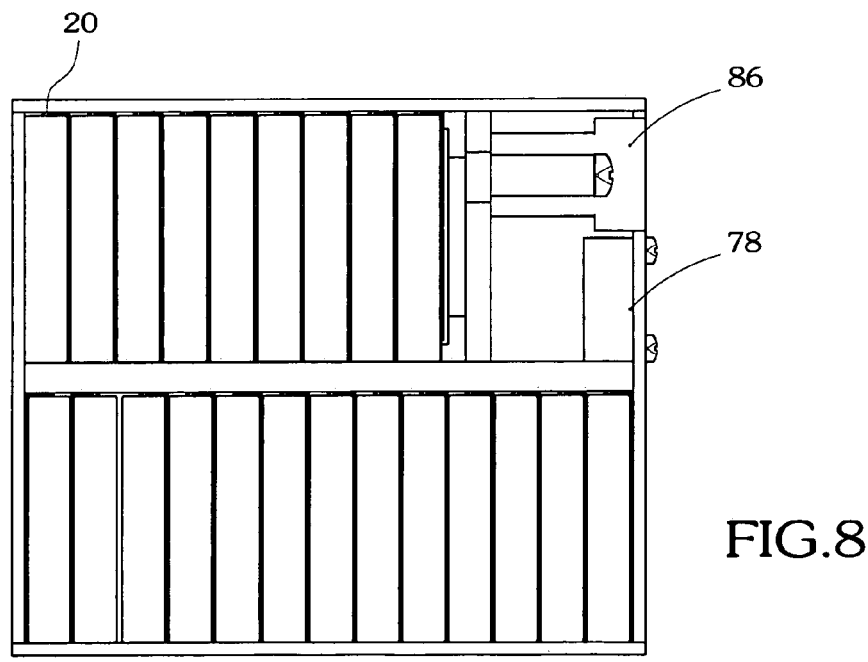
FIG. 8 is an inside view of the battery pack shown in FIG. 7.

FIG. 8 is an inside view of the battery pack shown in FIG. 7. In FIG. 8, there are two strings of series-connected zinc-air batteries 20. The two strings of zinc-air batteries 20 can be connected in series or in parallel. Therefore, if there are twelve zinc-air batteries 20 in both strings of zinc-air batteries 20, the battery pack 80 can output a voltage of 14 V or 28 V as desired. There is an electric connector 86 connected to one string of the zinc-air batteries 20 for outputting electric power. The wire diagram of the battery pack 80 can be similar to that of the lithium ion battery 5590.

In light of the foregoing, the invention provides an improved structure of a primary zinc-air battery, which is rectangular-shaped. Therefore, the primary zinc-air battery is suitable for mass production with little labor cost. In addition, the primary zinc-air battery comprises two air-cathodes to double the output power. Hence, the primary zinc-air battery can compete with the standard-sized batteries in the market. Moreover, a plurality of the zinc-air batteries can be electrically connected to form a battery pack to provide a higher voltage or a higher current as desired.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A primary zinc-air battery, comprising:
   a plastic holder of a rectangular shape having a vertical wall for defining two opposite openings;
   two sheets of separators covering the two openings, respectively;
   two first sealing elements sealing edges of the two openings and the two separators, respectively, for forming a cavity;
   an anode material located in the cavity;
   an electrolyte solution received in the cavity;
   an anode conductor located in the cavity;
   two sheets of air cathodes laminating over outer surfaces of the two separators;
   two second sealing elements located on edges of the two air cathodes, respectively;
   two conductive half-housings each having a vertical wall and a cathode opening, the two conductive half-housings connecting to the two air cathodes and encasing the two air cathodes to expose the two air cathodes from the cathode openings, respectively; and
   two cathode conductors located on the vertical wall of each of the conductive half-housings, respectively.

2. The primary zinc-air battery of claim 1, further comprising plural spacer rings bracketing over the two conductive half-housings for providing air passages.

3. The primary zinc-air battery of claim 2, wherein the spacer rings are made of rubber, polyvinyl chloride, or thermoplastic rubber.

4. The primary zinc-air battery of claim 1, wherein the anode material is zinc powder.

5. The primary zinc-air battery of claim 1, wherein the anode conductor is a copper conductor coated with a thin layer of hydrogen evolution inhibitor.

6. The primary zinc-air battery of claim 5, wherein the hydrogen evolution inhibitor is indium or tin.

7. The primary zinc-air battery of claim 1, wherein the anode conductor is pin-shaped and fixed in an anode opening, opposite to the cathode conductor and formed on the vertical wall of the plastic holder.

8. A primary zinc-air battery, comprising:
   a plastic holder of a rectangular shape having a vertical wall for defining two opposing openings;
   two sheets of separators covering the two openings, respectively;
   two first sealing elements sealing edges of the two openings and the two separators, respectively, for forming a cavity;
   an anode material located in the cavity;
   an electrolyte solution received in the cavity;
   an anode conductor located in the cavity;
   two sheets of air cathodes laminating over outer surfaces of the two separators;
   two second sealing elements located on edges of the two air cathodes, respectively; and
   two conductive half-housings each having a vertical wall and a cathode opening, the two conductive half-housings connecting to the two air cathodes and encasing the two air cathodes to expose the two air cathodes from the cathode openings, respectively.

9. The primary zinc-air battery of claim 8, wherein the anode material is zinc powder.

10. The primary zinc-air battery of claim 8, wherein the anode conductor is a copper conductor coated with a thin layer of hydrogen evolution inhibitor.

11. The primary zinc-air battery of claim 8, wherein the anode conductor is sinusoidal-shaped and two ends of the anode conductor are fixed in two tight holes on the vertical wall of the plastic holder.

12. The primary zinc-air battery of claim 11, wherein the two ends of the anode conductor jut out from the two tight holes and bend on one of the cathode openings.

13. The primary zinc-air battery of claim 12, further comprising two shims covering the exposed two ends of the anode connector for insulating the two ends of the anode from one of the two conductive half-housings.

14. The primary zinc-air battery of claim 13, wherein a plurality of the primary zinc-air batteries are connected in series or in parallel to form a battery pack.

15. A battery pack, comprising:
a plurality of primary zinc-air batteries of claim 13 being electrically connected;
a case encompassing the primary zinc-air batteries;
a fan installed on the case for supplying air to the zinc-air batteries;
a mesh covering the fan;
an electric connector installed on the case, the electric connector connecting the anode conductor of the zinc-air battery located at the end; and
a plurality of outlets provided on the case.

* * * * *